United States Patent [19]
Andersson et al.

[11] 3,727,403
[45] Apr. 17, 1973

[54] CONTROL DEVICE FOR CONTROLLING PREFERABLY SEVERAL FLUID PRESSURE OPERATED OBJECTS

[75] Inventors: Anders Andersson; Roger Lagerqvist; Stig Stenlund, all of Boras, Sweden

[73] Assignee: Monsun-Tison AB, Boras, Sweden

[22] Filed: Apr. 21, 1971

[21] Appl. No.: 136,155

[30] Foreign Application Priority Data

Apr. 21, 1970 Sweden ..................5509/70

[52] U.S. Cl. .....................60/427, 60/97 P, 60/422
[51] Int. Cl. ................................F15b 13/06
[58] Field of Search ............60/52 R, 97 P, 53 WW

[56] References Cited

UNITED STATES PATENTS

| | | | |
|---|---|---|---|
| 2,524,238 | 10/1950 | Soule | 60/97 P |
| 2,568,528 | 9/1951 | Welte | 60/52 R X |

*Primary Examiner*—Edgar W. Geoghegan
*Attorney*—Sommers & Young

[57] ABSTRACT

A control device is provided for controlling fluid pressure operated objects by individual valves connected in parallel to a common fluid pressure source and to a sump, and for unloading said fluid pressure source and to a sump, and for unloading said fluid pressure source when no object is operated. Said valves are of the type imparting to said objects, respectively, a direction of motion and speed of motion depending solely upon an individual input signal, and the fluid pressure source is provided with a regulating means adapted, partly, to maintain in a supply pipe to said valves the flow rate sufficiently high for supplying any operated object with a flow rate that cannot be diminished below the flow rate corresponding to the input signal to the corresponding valve by more than a limited quantity and, partly, to prevent the system pressure from exceeding the highest pressure demand of the objects operated at any moment, and, in case of controlling an energy delivering object or in case of no load operation, from exceeding the pressure level of the system sump by more than a value acceptable with respect to the efficiency.

3 Claims, 24 Drawing Figures

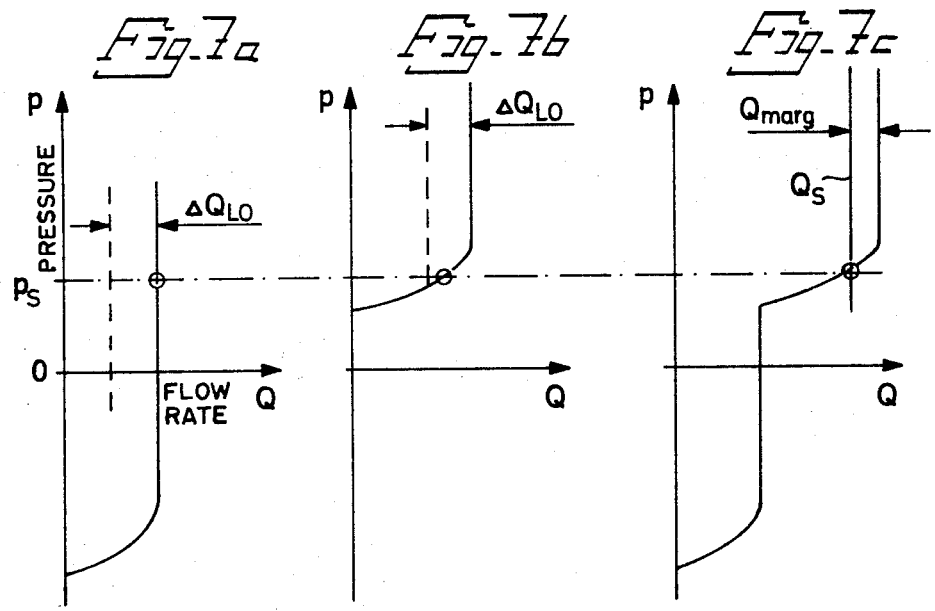
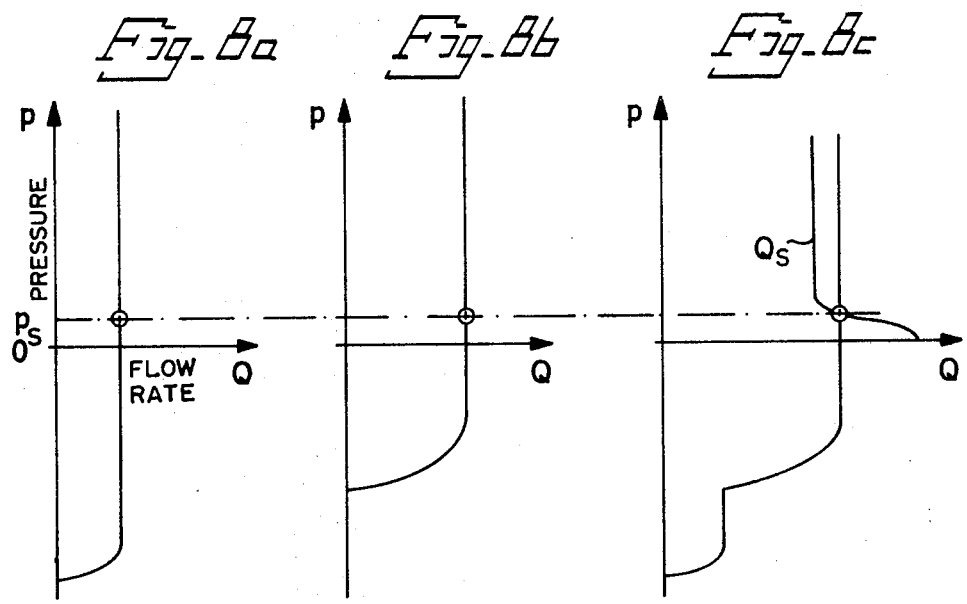

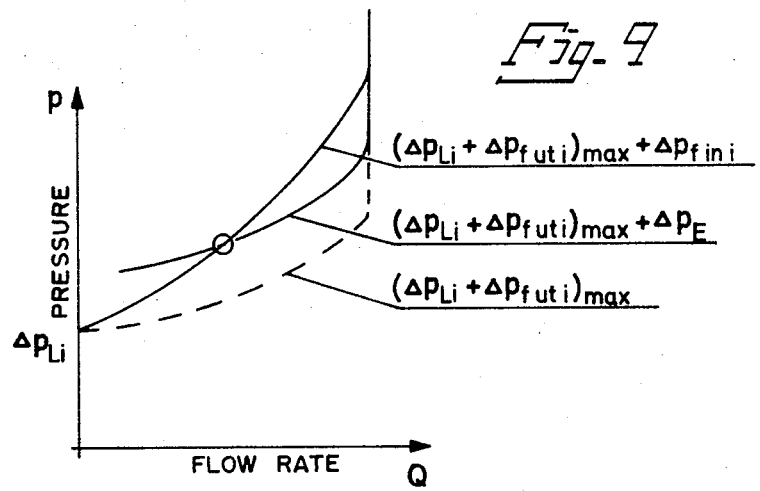
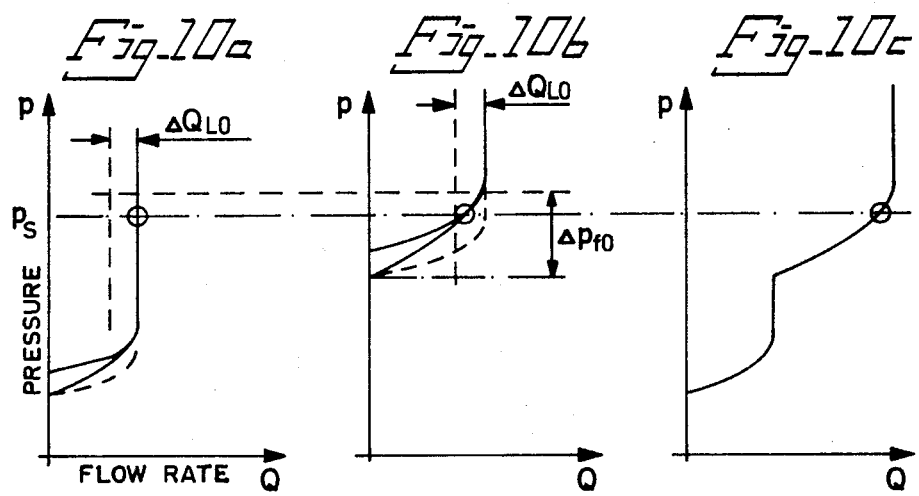
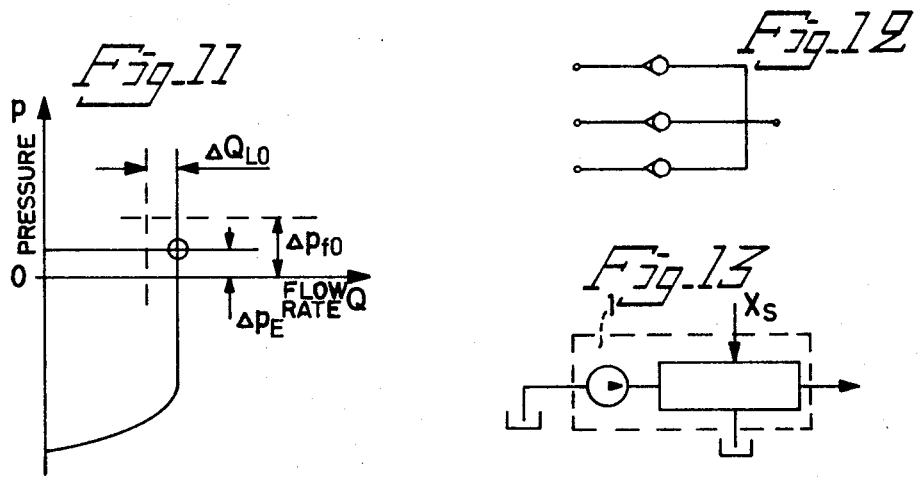

CONTROL DEVICE FOR CONTROLLING PREFERABLY SEVERAL FLUID PRESSURE OPERATED OBJECTS

BACKGROUND OF THE INVENTION

This invention relates to a control device for controlling preferably several fluid pressure operated objects, separately as well as several at the same time, each object being controlled by a separate valve, which valves are connected in parallel to one and the same fluid pressure source and to a sump, and for unloading said fluid pressure source when no object is operated.

The valves used for this purpose usually include a shunt function and are assembled to form a block at the operator's seat. From the valve block usually two high pressure pipes extend to each object to be operated. Accordingly the number of high pressure pipes on a jib (crane-arm) is very large, which is a serious drawback from a technical as well as practical point of view. A further essential drawback is that the operating of an object via a valve to a great extent influences the simultaneous operating of further objects. If, for example, at a slow turning of a jib a raising of the jib is started, the turning velocity of the jib is considerably changed. To counteract this effect it necessary in connection with the operating of a valve to operate at least one further valve. The magnitudes and directions of said further valve operations vary in each specific case and, thus, have to be estimated in advance, which is difficult to do due to the fact that only 10-20 percent of the stroke of the valve motion is utilized for the flow rate control, and the location of the flow rate control range varies with respect to the pressure difference of the object to be operated and the flow rate of the pump. Moreover, the operating of the valve slide is laborious. The latter drawbacks are valid also when operating only one object. These drawbacks can be partially eliminated by building a flow rate controlling effect into the valves based upon a sensing of the position of the valve slide or the flow rate. Even with this modification, however, undesirable dependence upon variations of the pressure of the fluid pressure source occurs at various loading conditions.

SUMMARY OF THE INVENTION

The object of the present invention is to achieve a simple and uncomplicated control device for controlling one or more objects, in which device the above mentioned drawbacks are eliminated.

According to the invention this is achieved by arranging said valves to impart to said objects, respectively, a direction of motion and a speed of motion depending solely upon an input signal, having a variable direction and magnitude, supplied to each valve, and being independent of whether the object is consuming or delivering energy during its motion and independent of the magnitude of the pressure drop across the corresponding valve. More particularly, a fluid pressure source is provided with a regulating means adapted to maintain in a supply pipe to said valves the flow rate sufficiently high to supply any operated object with a flow rate that cannot be diminished below the flow rate corresponding to the input signal to the corresponding valve by more than a limited quantity, for example 10 percent of the maximum flow rate to said objects. Moreover, the system pressure, in the case of controlling an energy consuming object, is prevented from exceeding the highest pressure demand of the objects operated at any moment, and, in the case of controlling an energy delivering object or in case of no load operation, is prevented from exceeding the pressure level of the system sump by more than a value acceptable with respect to the efficiency, i.e. a value sufficient to overcome the losses in pipes and said valves. Thus the system pressure characteristic of the power supply, i.e. of the fluid pressure source and the regulating means as a function of the flow rate delivered must be regulated so that the working point fulfils both conditions, which in turn have to be adapted to the pressure-flow rate characteristic of the valves. The regulating of the system pressure can be carried out by means of a shunt or a pump delivering a variable flow rate, located at the operator's seat and/or at the fluid pressure source, in which case the various valves can be located at the corresponding objects to be operated. The valves are connected by short branch pipes to a supply pipe of high pressure type common to all valves and objects to be operated, and to a return pipe, making it possible to optimize the distribution system and the components. The valves can be controlled via hydraulic or pneumatic low pressure pipes or mechanical connections, electrical connections or combinations of said pipes and connections.

Thus, when a valve controlling the heaviest load is operated, the system pressure will be adjusted by the heaviest load, which, as a consequence, is given a velocity slightly below the value corresponding to the input signal. The remaining lighter loads, however, are given velocities corresponding to their input signals.

Valves transmitting at least one flow rate which is substantially proportional to only an input signal are preferably adapted in a manner known per se to utilize impulse forces for the flow rate control, but also other methods can also be used, for instance based upon servo-techniques. Also means for controlling the system pressure in the intended manner are well known in the regulation technique.

According to an embodiment of the invention the intended regulation of the system pressure can be obtained in a simple manner without using pressure sensing and/or flow rate feeling means, in that $$Q_s = Q_1 + Q_2 + \ldots - Q_{marg}$$

wherein $Q_s$ = the flow rate in the supply pipe to said valves connected in parallel, $Q_1, Q_2 \ldots$ = the flow rates of the objects demanded by the control signals, $Q_{marg}$ = a limited flow rate, i.e. 10 percent of $Q_{smax}$ Thus, by setting the various valve setting means as required, a total flow rate reduced by a limited flow rate is demanded from the fluid pressure source. Hence, both the conditions necessary in accordance to the invention will be complied with automatically.

A further embodiment of the invention is characterized in that said valves, when controlling energy consuming objects, are arranged to sense the pressure in the supply pipe between the objects and their valves, respectively, and when controling energy delivering objects, and in neutral position, sense the pressure in the sump pipe. Means are provided for comparing all pressures sensed and for controlling the regulating means of the fluid pressure source to the highest one of these pressures, so that the pressure in the supply pipe of the valves connected in parallel always amounts to the sum of said highest pressure and the pressure drops in the pipes and said valves. By utilizing the maximum pressure in the supply pipes for controlling the fluid supply of the valves each object to be operated is supplied automatically with a flow rate, which cannot drop below the value corresponding to the input signal by more than a limited quantity.

BRIEF DESCRIPTION OF THE DRAWINGS

The invention will be apparent from the following description illustrated with reference to the accompanying drawings, wherein:

FIGS. 7a, 7b and 7c are similar curves in connection with and power delivering objects to be operated together with valves having a linear proportionality;

FIGS. 8a, 8b and 8c are the curves corresponding to FIGS. 7a–7c but in connection with power delivering objects;

FIG. 9 depicts the pressure-flow rate characteristics of a system using a regulation of the power supply in dependence of pressure in supply pipe to the object having the highest pressure;

FIGS. 10a, 10b and 10c show the pressure-flow rate characteristics of two objects to be operated as well as the common curve of a system according to FIG. 9, respectively;

FIG. 11 is the pressure-flow rate characteristic of a power delivering object to be operated;

FIG. 12 schematically shows a device for deciding the highest pressure in the system shown in FIGS. 9 to 11; and FIG. 13 schematically shows, as an example, a means for regulating the power supply.

DESCRIPTION OF THE PREFERRED EMBODIMENTS

Figure 1:
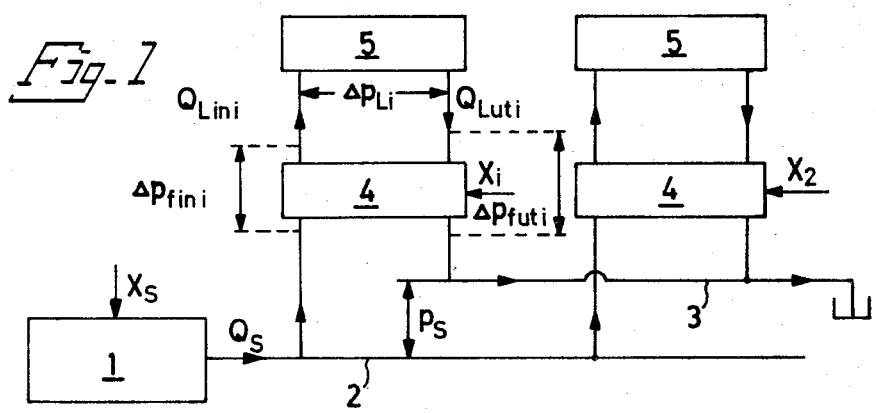
FIG. 1 is a schematic diagram illustrating a number of objects to be operated, each object being fed via a valve from a common fluid pressure source.
Figure 2:
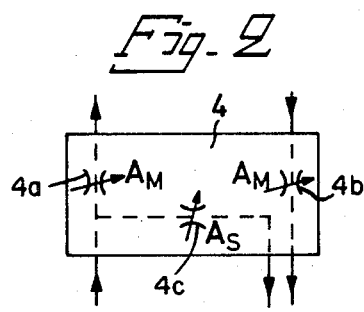
FIGS. 2 and 2a illustrate a known design of the valves and the corresponding throttle area characteristics.
Figure 2A:
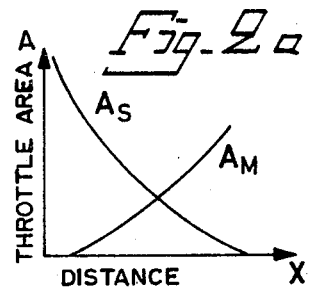

The system shown in FIG. 1 is provided with a hydraulic pump comprising a fluid pressure source 1 provided with a pressure pipe 2. Between pipe 2 and a return pipe 3 a number of valves 4 are connected (only two valves are shown on the drawing). An object 5 to be operated is connected to each valve 4. Conventional valves 4 are usually combined with shunt duct, and a valve of this type is schematically shown in FIG. 2. The shunt ducts of all valves have to be connected in series to a sump. The control characteristics are determined by a co-action between the three variable throttlings 4a, 4b and 4c, shown in FIG. 2, presenting the areas $A_M$ and $A_S$, which vary in dependence on a distance $x$ from a neutral position of a movable valve slide, as shown in FIG. 2a, As shown in FIG. 2a the throttling area $A_S$ is relatively large when $x = 0$ and the fluid can flow from the pump directly to the sump at a low pressure $p_s$. The object to be operated is locked at this moment. The control characteristics are influenced by the flow rate of the pump as well as the load pressure. If $X_s$, $x_1$ and $x_2$ are the input signals for regulating the pressure of the fluid pressure source 1 and setting the valves 4, respectively, in a conventional system, $x_s$ and $x_1$ as well as $x_s$ and $x_2$ are forcibly connected without regard to the flow rate of the fluid pressure source and the load pressure of the objects to be operated, which gives rise to rather poor control characteristics. Only 10 to 20 percent of the stroke of the valve slides are utilized for the control of the flow rate, the position of the fluid rate controlling range varies, the operating of one object can be considerably influenced by the operating of another object, and the shunt duct cannot be separated from the rest of the valve.

FIG. 1 also discloses the hydraulic quantities of a hydraulically controlled system according to the invention. The objects to be operated are denoted with numbers, an object denoted with a lower number having a heavier load than an object denoted with a higher number, and an arbitrary pair of object and valve is denoted with the letter $i$. Thus, the load pressures of the objects to be operated are defined by $$\Delta p_{L,1} \geq \Delta p_{L,2} \geq \Delta p_{L,3} \text{ etc.}$$

$\Delta p_{L,i} > 0$ means that hydraulic power is consumed by the object (a motor) and $\Delta p_{L,i} < 0$ means that hydraulic power is delivered by the object (a pump).

$Q_{L\ in\ i}$ and $Q_{L\ ut\ i}$ are flow rates supplied to or received from the object, respectively, which flow rates may amount to different values.

$\Delta p_{f\ in\ i}$ and $\Delta p_{f\ ut\ i}$ are the pressure drops in a valve corresponding to the flow rates:

$$\Delta p_{f\ i} = \Delta p_{f\ in\ i} + \Delta p_{f\ ut\ i}$$

Figure 3:
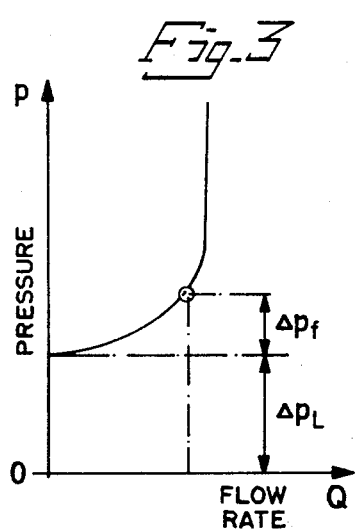
FIGS. 3 and 4 are curves illustrating the pressure as a function of the flow rate of a valve of the type used in connection with the invention and an object to be operated, of the type consuming hydraulic power, and a corresponding valve controlling an object of the type delivering hydraulic power, respectively.

FIG. 3 illustrates the relation $\Delta p_{Li} + \Delta p_{f\ i} = f(Q_{L\ in\ i})$ for an object to be operated and a valve at a determined input signal. The fluid flow transmitted by the valve becomes constant when $\Delta p_{f\ i}$ exceeds a certain value. In this case $\Delta p_{L\ i} > 0$ and, thus the object is consuming the hydraulic power.

Figure 4:
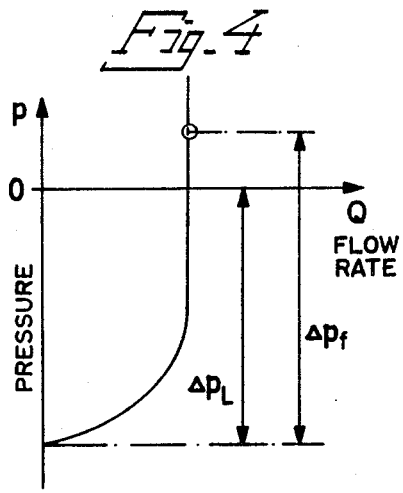

FIG. 4 illustrates $\Delta p_{L\ i} + \Delta p_{f\ i} = f(Q_{L\ in\ i})$, wherein $\Delta p_{L\ i}$ is $< 0$. The object is delivering hydraulic power. A working point is indicated by a ring on the curves.

Figure 5A:
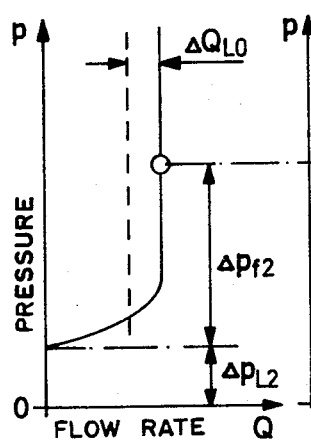
FIGS. 5a, 5b and 5c are the corresponding curves in connection with two power consuming objects to be operated and valves and the common curve, respectively.
Figure 5B:
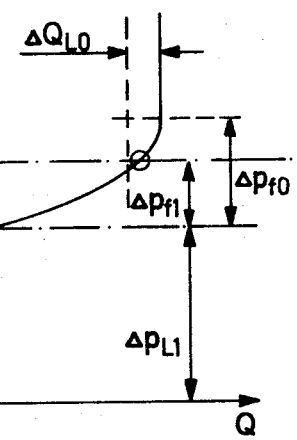
Figure 5C:
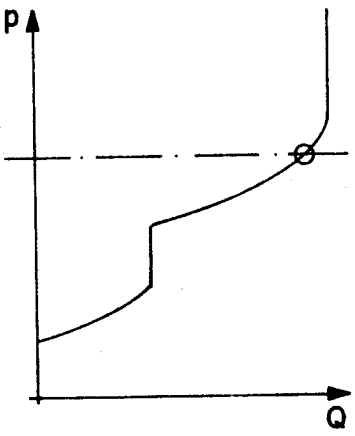

FIGS. 5a and 5b illustrate the corresponding curves of two objects and valves. Their common curve is shown in FIG. 5c.

According to the invention the working point has to fulfil two conditions, viz.:

1. each object shall have a flow ate that must not diminish below the flow rate corresponding to the input signal by more than a limited quantity, $\Delta Q_{L0}$, and 2. the system pressure, $p_s$, must not exceed the highest positive load pressure by more than a value acceptable with respect to the efficiency, $\Delta p_{f0}$. The vertical dotted line in FIGS. 5a and 5b indicates the limit according to the first-mentioned condition or stipulation. The object in FIG. 5b presents the highest positive load pressure, $\Delta p_{L1}$, and the horizontal dotted line in FIG. 5b indicates the limit according to the second condition or stipulation. The working point indicated by a ring in the figures fulfils these stipulations.

Figure 6A:
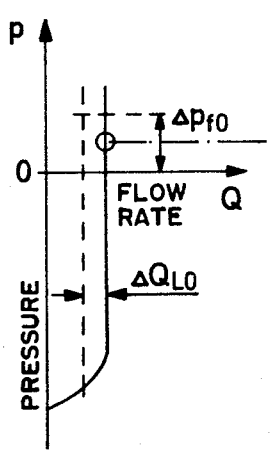
FIGS. 6a, 6b and 6c are the curves corresponding to FIGS. 5a–5c but in connection with power delivering objects.
Figure 6B:
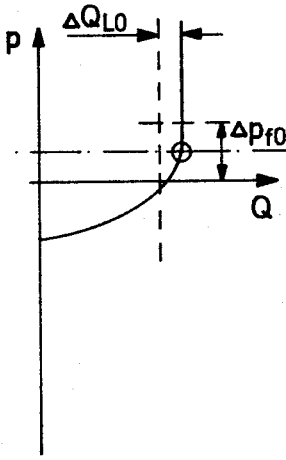
Figure 6C:
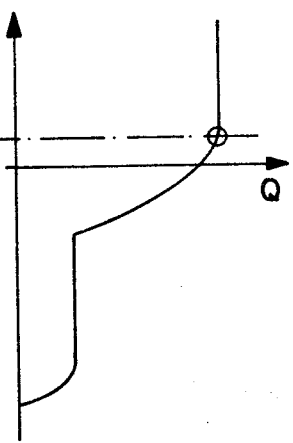

FIGS. 6a, 6b and 6c illustrate the corresponding curves in connection with negative load pressures. As to the working point the first-mentioned stipulation remains unvaried but the second stipulation now is that the system pressure, $p_s$, must not exceed zero pressure by more than a value acceptable with respect to efficiency, $\Delta p_{f0}$ at negative loads.

The working point indicated in the figures fulfils these stipulations

The power supply characteristic is $p_s = f(Q_s)$. The intersectional point of the power supply curve and the curve of the objects and valves, connected in parallel, is the working point of the system.

FIGS. 7a, 7b and 7c illustrate the working principle of the device constructed in accordance with another embodiment of the invention. In this case, $$Q_s = k(y_1 + y_2 + \ldots - y_{maru}) = Q_1 + Q_2 + \ldots - Q_{maru}$$

wherein $y_1, y_2 \ldots$ is a control signal derived from the input signal $x_{1,2\ldots}$ and linearly proportional to $Q_{L\ in\ 1,2\ldots}$. These values added and reduced by a certain quantity control the power supply, which in the p-Q-diagram (FIG. 7c) has a vertical characteristic. In FIG. 7c the corresponding working point is indicated by a ring and from this system pressure, $p_s$, the working points of the curves in FIGS. 7a and 7b are derived.

FIGS. 8a, 8b and 8c illustrate the corresponding conditions in case of negative load pressure.

The control signal, $y_i$, is equal to the input signal, $x_i$ if a linear proportionality exists between the input signal and $Q_{L\ in\ i\ldots}$.

The input signal may consist of an electric current in an electrical-hydraulical valve, a hydraulic pressure in a hydraulically controlled valve, or a force. The adding of these quantities is a problem, the solution of which is well-known in the art.

The hydraulic power supply may comprise a variable pump, in which the control signal controls $Q_s$ or a fixed pump having an adjustable shunt duct to a sump.

FIG. 9 discloses the working principle of the device constructed in accordance with a further embodiment of the invention. In the p-Q-diagram the curve defines the supply pressure to an object having a positive load pressure, $\Delta p_{L\ i}$: $\Delta p_{L\ i} + \Delta p_{f\ ut\ i} = f(Q_{L\ in\ i})$.

This pressure is considered as the highest pressure of a number of objects and is controlling the hydraulic power supply up to a pressure level exceeding the highest pressure by the quantity $\Delta p_E$. This relation $p_s = \Delta p_E + (\Delta p_{L\ i} + \Delta p_{f\ ut\ i})_{max}$ is shown in FIG. 9.

The intersectional point of curve $p_s = (\Delta p_E + \Delta p_{f\ ut\ i})_{max}$ and curve $p_s = (\Delta p_{L\ i} + \Delta p_{f\ ut\ i})_{max} + \Delta p_{f\ in\ i}$ defines the working point.

FIGS. 10a, 10b, 10c illustrate two objects operated in parallel. The object in FIG. 10b has the highest value ($\Delta p_{L\ i} + \Delta p_{f\ ut\ i}$) and the pressure $p_s$ of the working point indicated by a ring defines the working point in FIG. 10a.

The dotted lines define the range within which the working points have to be located.

FIG. 11 illustrates the conditions in case of negative load pressure. The lowest pressure than can be sensed is zero and the power supply curve is located at pressure $\Delta p_E$. The dotted lines indicate the limits in accordance with the invention.

The pressure $\Delta p_E$ may have a varying value and may for instance increase when $Q_s$ increases, for compensating pressure drops in pipes etc.

The treatment of signals can, as mentioned above, be carried out in various ways, e.g. hydraulically or electrically. The highest pressure can be determined by means of one-way valves as shown in FIG. 12, which value can be used for controlling the pressure supply. The electrical solution makes it necessary to convert hydraulic pressures into electrical signals, the highest signal being determined by means of e.g. diodes. Solutions in connection with these problems are well-known in the regulation technique.

The hydraulic power supply can, as mentioned above, be realized by means of a variable displacement pump having an adjustable pressure, or a pump having a fixed displacement and an adjustable shunt duct, as shown in FIG. 13.

What is claimed is:

1. A control device for controlling preferably several fluid pressure operated objects, separately as well as several at the same time, each object being controlled by a separate valve, which valves are connected in parallel to one and the same fluid pressure source and to a sump, and for unloading said fluid pressure source when no object is operated, characterized in that said valves are arranged to impart to said objects, respectively, a direction of motion and a speed of motion depending solely upon an input signal having a variable direction and magnitude, supplied to each valve, and being independent of whether the object is consuming or delivering energy during its motion and independent of the magnitude of the pressure drop across the corresponding valve, the fluid pressure source being provided with a regulating means adapted to maintain, in a supply pipe to said valves, the flow rate sufficiently high to supply any operated object with a flow rate that cannot be diminished below the flow rate corresponding to the input signal to the corresponding valve by more than a limited quantity, for example 10% of the maximum flow rate to said objects, said regulating means being further adapted to prevent the system pressure, in the case of controlling an energy consuming object, from exceeding the highest pressure demand of the objects operated at any moment, and, in the case of controlling an energy delivering object or in the case of no load operation, from exceeding the pressure level of the system sump by more than a value acceptable with respect to the efficiency, i.e. a value sufficient to overcome and losses in the pipes and said valves.

2. A device as claimed in claim 1, characterized in that said valves are arranged to transmit flow rates which are linearly proportional to control signals derived from said input signals, in addition to which there is provided a means for adding said control signals and for adjusting said regulating means of said fluid pressure source so that $$Q_s = Q_1 + Q_2 + \ldots - Q_{maru}$$

wherein $Q_s$ = the flow rate in the supply pipe to said valves connected in parallel, $Q_1, Q_2 \ldots$ = the flow rates of the objects demanded by the control signals, and $Q_{marg}$ = a limited flow rate, i.e. 10 percent of $Q_{s\ max}$ 3. A device as claimed in claim 1, characterized in that said valves when controlling energy consuming objects are arranged to sense the pressure in the supply pipe between the objects and their valves, and, when controlling energy delivering objects and in neutral position, sense the pressure in the sump pipe, in addition to which there is a means for comparing all pressure sensed and for controlling the regulating means of the fluid pressure source to the highest one of these pressures, so that the pressure in the supply pipe of the valves connected in parallel always amounts to the sum of said highest pressure and the pressure drops in the pipes and said valves.

* * * * *